(12) United States Patent
Hirai (10) Patent No.: US 6,324,577 B1
(45) Date of Patent: Nov. 27, 2001

(54) NETWORK MANAGEMENT SYSTEM FOR MANAGING STATES OF NODES

(75) Inventor: Jun Hirai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/172,041

(22) Filed: Oct. 14, 1998

(30) Foreign Application Priority Data

Oct. 15, 1997 (JP) .................................................. 9-282044

(51) Int. Cl.⁷ ...................................................... G06F 13/00
(52) U.S. Cl. ............................ 709/223; 713/201; 370/254
(58) Field of Search ................................. 709/223, 224, 709/203, 225–226, 227, 228; 370/254, 389, 401; 713/201

(56) References Cited

U.S. PATENT DOCUMENTS

| | | | | |
|---|---|---|---|---|
| 5,586,255 | * | 12/1996 | Tanaka et al. | 709/223 |
| 5,621,663 | * | 4/1997 | Skagerling | 702/186 |
| 5,748,896 | * | 5/1998 | Daly et al. | 709/223 |
| 5,848,233 | * | 12/1998 | Radia et al. | 713/201 |
| 5,922,049 | * | 7/1999 | Radia et al. | 709/220 |
| 6,003,083 | * | 12/1999 | Davies et al. | 709/226 |
| 6,009,103 | * | 12/1999 | Woundy | 370/401 |
| 6,023,464 | * | 2/2000 | Woundy | 370/352 |
| 6,038,233 | * | 3/2000 | Hamamoto et al. | 370/401 |
| 6,061,349 | * | 5/2000 | Coile et al. | 370/389 |
| 6,070,242 | * | 5/2000 | Wong et al. | 713/201 |
| 6,128,644 | * | 10/2000 | Nozaki | 709/203 |

* cited by examiner

*Primary Examiner*—David Wiley
(74) *Attorney, Agent, or Firm*—Finnegan, Henderson, Farabow, Garrett & Dunner, L.L.P.

(57) ABSTRACT

A network management system for managing various states of nodes to which IP addresses are dynamically assigned in an IP address assigning section incorporated in a network includes a management data base for storing at least a name, IP address and operating state of the node for each node, management information outputting means for outputting storage contents of the management data base as management information for each node, assigning information collecting means for collecting changes of assigning information in the IP address assigning section when the IP address assigning section makes a change of assigning information of the IP address for each node, and data base managing means for updating the storage contents of the management data base to newest information based on assigning information of the IP address of each node collected by the assigning information collecting means.

20 Claims, 10 Drawing Sheets

MANAGEMENT DATA BASE

| HOST NAME | DOMAIN NAME | IP ADDRESS | ASSIGNMENT TIME | STATE UPDATING TIME |
|---|---|---|---|---|
|  |  |  |  |  |
|  |  |  |  |  |
|  |  |  |  |  |
|  |  |  |  |  |

IP ADDRESS ASSIGNIG MESSAGE (DHCP→NODE)

| IP ADDRESS |
|---|
| LEASE TIME |
| HOST NAME |
| DOMAIN NAME |

IP ADDRESS ASSIGNIG MESSAGE (DHCP→MANAGEMENT SYSTEM)

| IP ADDRESS |
|---|
| LEASE TIME |
| HOST NAME |
| DOMAIN NAME |

IP ADDRESS RELEASING MESSAGE (DHCP→MANAGEMENT SYSTEM)

| IP ADDRESS | ~31 |
|---|---|

FIG. 8

IP ADDRESS ASSIGNMENT TABLE

| IP ADRESS | ASSIGNED HOST NAME | ASSIGNED DOMAIN NAME | FINAL ASSIGNMENT TIME | |
|---|---|---|---|---|
| 133.113.214.71 | HOST C | yamada.kab.co.jp | 7:20 | LEASE TIME T |
| 133.113.214.70 | HOST A | yamada.kab.co.jp | 9:00 | |
| 133.113.214.69 | HOST B | yamada.kab.co.jp | 2:15 | |
| | | | | ~27 |

MANAGEMENT DATA BASE 23a

| HOST NAME | DOMAIN NAME | IP ADDRESS | ASSIGNMENT TIME | STATE | STATE UPDATING TIME Tg |
|---|---|---|---|---|---|
|  |  |  |  |  |  |
|  |  |  |  |  |  |
|  |  |  |  |  |  |

NETWORK MANAGEMENT SYSTEM FOR MANAGING STATES OF NODES

BACKGROUND OF THE INVENTION

This invention relates to a network, a network management system for managing various states of nodes incorporated in the network, and a recording medium storing a program.

Figure 1:
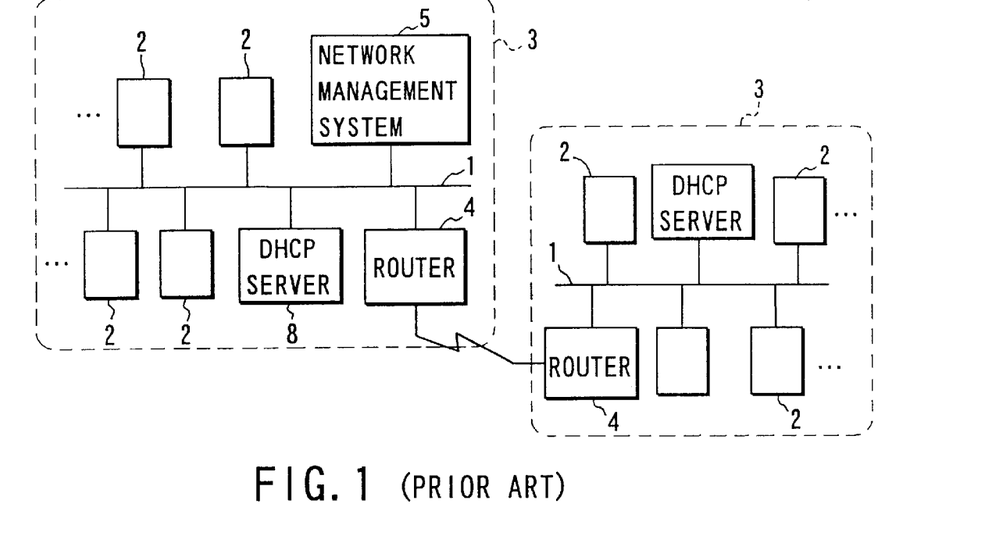
FIG. 1 is a schematic diagram showing a network in which a conventional network management system is incorporated.

As shown in FIG. 1, in a general information network system, a plurality of networks 3 each constructed by a LAN are connected via routers 4. In each network, a large number of nodes 2 are connected to a transmission line 1. In each of the networks 3, a network management system 5 may be connected.

The network management system 5 remotely monitors and manages the operating state, fault information and configuration information of a computer and communication device such as a hub and the router 4 connected to the transmission line 1 of the network 3 such as the LAN. In this specification, the router 4 and the computer or communication device such as a hub are generally called the node 2 below.

Fault information contains information indicating whether each node 2 is normally operated or stopped and information indicating the type of fault and the node 2 in which the fault occurs. Further, configuration information contains information indicating the connection relation (which is also called topology) between the networks 3 and information indicating the type of the node 2 incorporated in the network 3.

Figure 2:
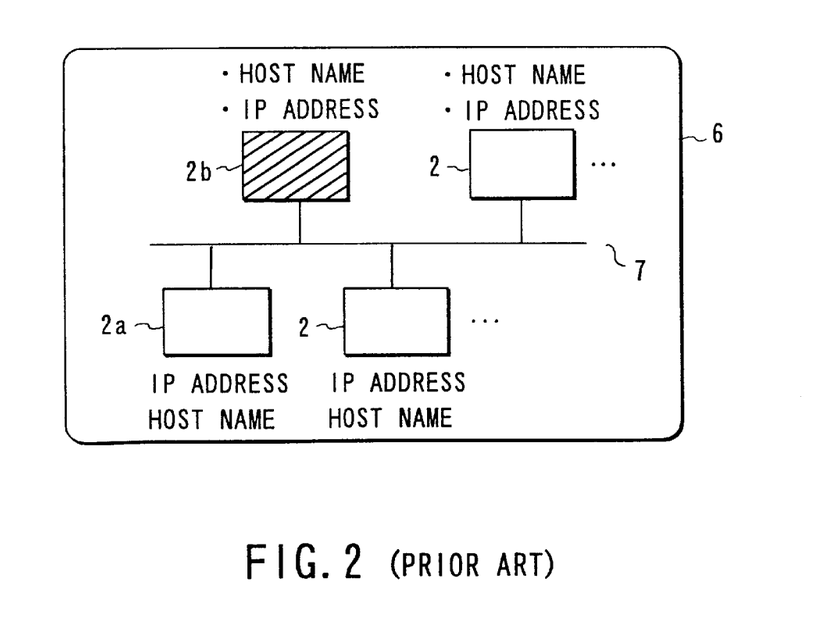
FIG. 2 is a diagram showing the display contents of a display in the conventional network management system.

Generally, the network management system 5 stores and holds fault information and configuration information of the network 3 in a management data base. For example, as shown in FIG. 2, the network management system 5 displays the configuration information on a display screen 6 of a display device in such a configuration as a network configuration diagram 7 which will be easily understood by the operator. Further, the network management system 5 displays fault information in such a manner as to change the color of a portion indicating a corresponding node 2 according to the operating state of the node 2 on the display screen 6. Specifically, a normal node 2a is displayed in green and a fault node 2b is displayed in red.

As shown in FIG. 2, the internet protocol (IP) address and the host name which is part of the name of the node 2 are displayed for each node 2 on the screen 6.

In order to display the above network information, it is necessary to collect the newest configuration information and fault information described before. There are various methods for collecting the newest configuration information and fault information by use of the network management system 5.

For example, a basic method in which the operator inputs the configuration of the network 3 via an input screen can be considered.

However, the above setting operation is extremely complicated, and therefore, a method in which the network management system 5 automatically collects the information directly from the network 3 is proposed. For example, the network management system 5 detects one node 2 on the network 3 by use of proper means and registers the IP address and the name information containing the domain name and host name relating to the node 2 into the management data base.

Then, the network management system 5 makes an inquiry about configuration information of another node 2 to the registered node 2 by use of the IP address. The node 2 receiving the inquiry from the network management system 5 sends the IP address and the host name of another node 2 with which it communicated in the past to the network management system 5. Thus, the network management system 5 sequentially traces the nodes 2 in a preset order to obtain the current network configuration diagram 7 shown in FIG. 2 (U.S. Pat. No. 5,185,860).

However, the network management system 5 using a method for sequentially tracing the nodes 2 connected to the transmission line 1 of the network 3 in a preset order has the following problems.

As shown in FIG. 1, a preset number of IP addresses are stored (pooled) in a DHCP (Dynamic Host Configuration protocol) server 8 used as an IP address assignment section provided in the network 3 instead of fixedly assigning the IP addresses to the respective nodes 2 connected to the transmission line 1 of the network 3. The network 3 for assigning one of the IP addresses pooled in the DHCP server 8 to the node 2 of request source in a specified preset lease period T only when an assignment request is issued from the node 2 is put to practical use.

The node 2 which has received the IP address is permitted to communicate with the nodes 2 of its own network 3 and the nodes 2 of another network 3 via the router 4 by use of the IP address. In a case where the node 2 uses the same IP address after the elapse of the lease period T, the node 2 can continuously use the IP address if it issues an update request (lease rewriting request) for the IP address assignment to the DHCP server 8.

Thus, if the DHCP server 8 manages in a lump the IP addresses used in the network 3, the address assignment process and address release process effected when the node 2 is temporarily connected to the transmission line 1 of the network 3, when the node 2 is eliminated from the network 3 or when the node 2 is not used for a long period of time can be extremely simplified. Particularly, in a state in which the mobile computing system is being developed, it becomes important to quickly grasp configuration information of the node 2 newly connected to the network 3 and deal with the node as a to-be-managed object.

However, in the network management system 5, since configuration information items of the nodes 2 are collected by sequentially tracing the nodes 2 in a preset order, for example, a large amount of processing time is necessary to collect the IP address of a node 2 newly added to the network 3. As a result, there may occur a problem that configuration information of the nodes 2 constructing the network 3 displayed on the display screen 6 of the network management system 5 is different from configuration information of the nodes 2 of the actual network 3.

Next, a case wherein the node 2 is eliminated from the network 3 or the operation thereof is stopped for a long period of time will be explained.

Basically, the network management system 5 periodically sends a diagnosis signal to the nodes 2 and determines whether each node 2 is operated or stopped based on whether a response to the diagnosis signal is obtained or not. In a case where the operation of the node 2 is interrupted, information of the corresponding node 2 in the management data base is deleted when a preset permissible period has elapsed.

Next, the node 2 to which the IP address is assigned by the DHCP server 8 is considered. It is meaningless for the network management system 5 to manage the IP address which is assigned to the node 2 after the operation of the node 2 is interrupted, the lease period T of the IP address is expired and the IP address is released by the DHCP server 8.

After the IP address is released from one of the nodes 2, it may be assigned to another node 2 which attempts to newly acquire an IP address in the DHCP server 8. Therefore, it is a problem that the network management system 5 manages the released IP address as the IP address of the node 2 to which the released IP address was previously assigned.

That is, even if the IP address is assigned to another node 2, the IP address is dealt with as the IP address of the previous node 2 until the node 2 is detected by the network management system 5. As a result, since information on the network management system 5 does not coincide with the status on the actual network 3, the manager may misunderstand the situation.

BRIEF SUMMARY OF THE INVENTION

This invention has been made to solve the above problem, and an object of this invention is to provide a network and network management system capable of updating management information for each node displayed to newest information without delay even when a node is newly incorporated into the network, the node is eliminated from the network, or the IP address of the node is changed.

A first aspect of this invention is applied to a network management system for managing various states of nodes to which IP addresses are dynamically assigned by an IP address assigning section of the network.

In order to attain the above object, a network management system according to the first aspect of this invention comprises a management data base for storing at least a name, IP address and operating state of a node for each node; management information outputting means for outputting storage contents of the management data base as management information for each node; assigning information collecting means for collecting changes in an IP address assigning section when the IP address assigning section makes a change of IP address assigning information for each node; and data base managing means for updating the storage contents of the management data base to newest information based on the IP address assigning information of each node collected by the assigning information collecting means.

In the network management system described above, each time the IP address is newly assigned to the node, the IP address assigned for each node is updated, or the IP address assigned for each node is released, then, a change of the assigning information is collected in the network management system and the storage contents of the management data base are updated to newest information by use of the assigning information. Therefore, management information for each node displayed, for example, is updated without delay with respect to the newest information.

A second aspect of this invention is applied to a network management system for managing various states of nodes which are incorporated in the network and to each of which an original name constructed by a combination of a host name and a domain name, for example, and a dynamically changing IP address are given.

In order to attain the above object, a network management system according to the second aspect of this invention comprises a management data base for storing at least a name, IP address and operating state of a node for each node; management information outputting means for outputting storage contents of the management data base as management information for each node; related information collecting means for collecting changes of related information in a name server when the name server for monitoring the related information of the name and IP address of each node detects a change of the related information of the name and IP address; and data base managing means for updating the storage contents of the management data base to newest information based on related information of the name and IP address collected by the related information collecting means.

In the network management system thus constructed, information is obtained from the name server.

The name server manages the relation between the name of each node in the network and the dynamically changing IP address of the corresponding node. The related information of the name and IP address, for example, the related information of a new IP address for each name, updating information of the relation between the name and IP address and cancellation of the relation between the name and IP address is collected from the name server. The storage contents of the management data base are updated to newest information based on the related information.

A third aspect of this invention is applied to a network management system for managing various states of nodes to which IP addresses are dynamically assigned by an IP address assigning section incorporated in the network.

In order to attain the above object, a network management system according to the third aspect of this invention comprises a management data base for storing at least a name, IP address and operating state of a node for each node; management information outputting means for outputting storage contents of the management data base as management information for each node; a node state monitoring section for repetitively diagnosing the operating state of each node; and data base management means for updating the storage contents of the management data base to newest information based on the operating state of each node obtained from the node state monitoring section and deleting at least the IP address of a node in the management data base when the corresponding node is not operated for a period exceeding a preset period of time determined based on the IP address assignment time in an IP address assigning section.

In the network management system thus constructed, the state of each node is diagnosed and the result of diagnosis is registered in the management data base. For example, if the period of the stopped state of the node exceeds a preset period of time determined based on the IP address assignment time in the IP address assigning section such as the DHCP server, the IP address of the corresponding node is deleted.

That is, as described before, when the node does not update the IP address assigned thereto, the node will not use the IP address if the assignment time (lease period) specified by the IP address assigning section is exceeded.

Therefore, when the node is set in the stopped state, the IP address is not updated after it has been set into the stopped state, and as a result, it becomes possible for the IP address assigning section to assign the IP address to another node at least after elapse of the assignment time. Therefore, in the network management system, the corresponding IP address of the node set in the stopped state may be deleted at least after elapse of the assignment time.

Thus, output management information for each node more closely coincides with actual information of the network.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

There will now be described embodiments of this invention with reference to the accompanying drawings.

First Embodiment

Figure 3:
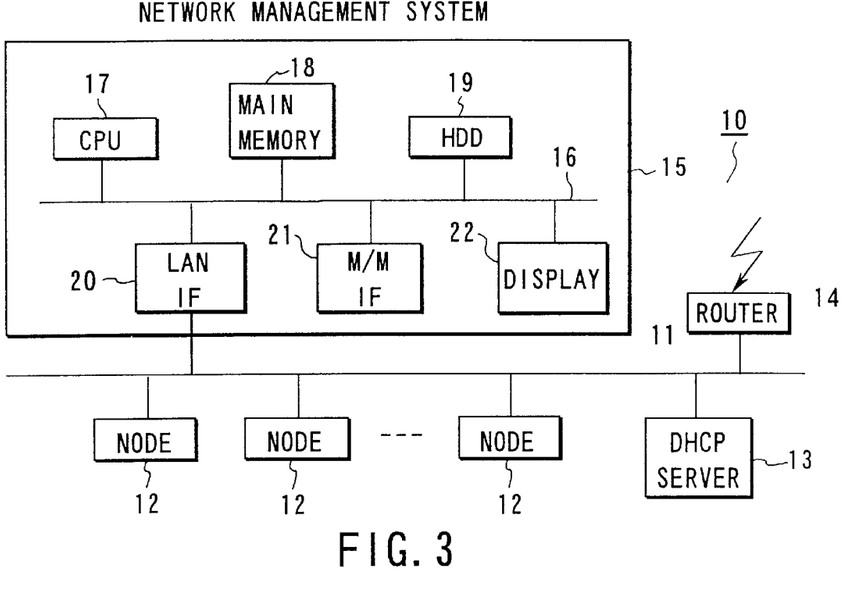
FIG. 3 is a diagram showing a network in which a network management system according to a first embodiment of this invention is incorporated.

FIG. 3 is a block diagram showing the schematic of a network in which a network management system according to a first embodiment of this invention is incorporated.

For example, a plurality of nodes 12, a DHCP server 13 acting as an IP address assigning section, a router 14 and a network management system 15 are connected to a transmission line 11 of a network 10 such as a LAN. The DHCP server 13 has a function of independently managing a plurality of IP addresses which can be used in the network 10 and assigning the IP address to each node 12 as required. Inherent IP addresses are originally assigned to the DHCP server 13, router 14 and network management system 15.

The router 14 has a relay function when the node 12 of the network 10 communicates with a node of another network.

As shown in FIG. 3, the network management system 15 is constructed by a type of information processing device such as a computer. A CPU 17 for performing various information processes, a main memory 18 such as a RAM for storing various programs, an HDD 19 used as an external memory device, a LAN interface 20 connected to the transmission line 11 of the network 10, a man/machine (M/M) interface 21 is a device for permitting the operator to input various operating instructions, for example such as keyboard or a mouse, and a display 22 on which management information for each of the nodes 12 is displayed are connected to a system bus 16.

Figure 4:
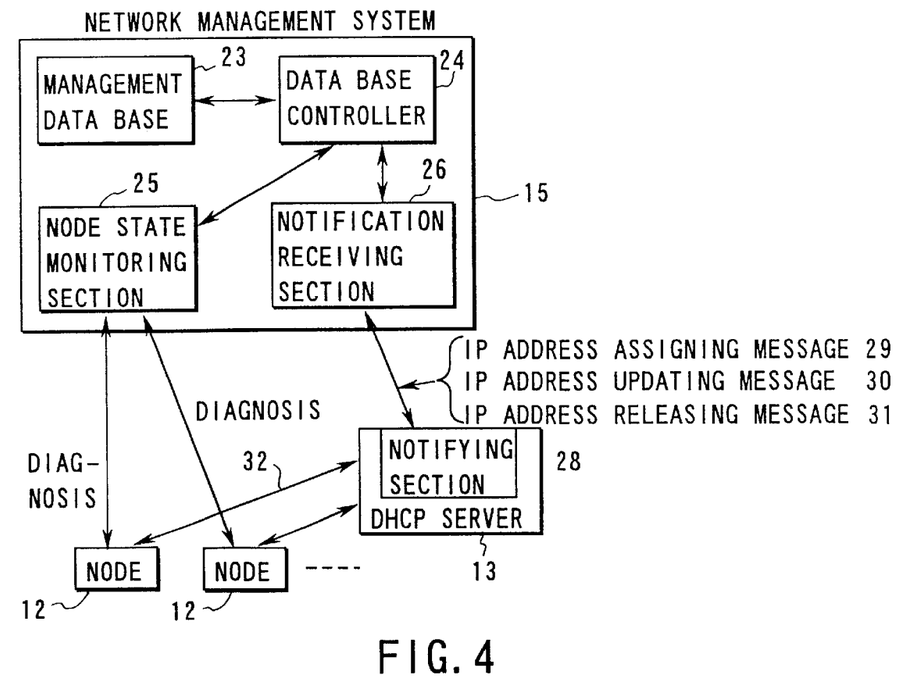
FIG. 4 is a block diagram showing various processing sections formed on an application program of the network management system according to the first embodiment.

FIG. 4 is a block diagram showing the relation between the DHCP server 13 and a management data base 23 formed in the HDD 19, a data base control section 24 formed as a program module on the application program stored in the storage medium such as the main memory 18, a node state monitoring section 25, notification receiving section 26 and external nodes 12 in order to realize the function of the network management system 15.

Figure 5:
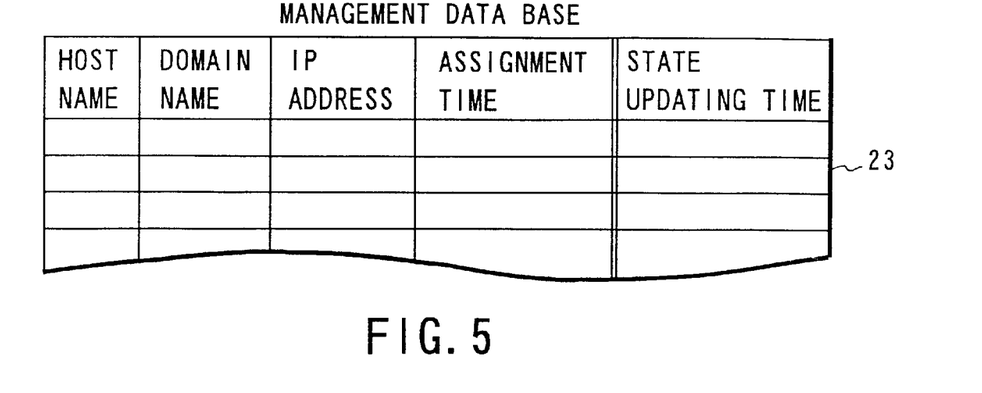
FIG. 5 is a diagram showing storage contents of a management data base formed in the network management system according to the first embodiment.

As shown in FIG. 5, in the management data base 23, management information including a name information including a host name and domain name, an IP address, IP address assignment time, the state obtained in the diagnosis, last state updating time Tg and the like is stored for each node 12 incorporated in the network 10.

The node state monitoring section 25 periodically issues a diagnosis message to each node 12 recorded in the management data base 23 and determines the operating/stopped state of the node 12 based on whether a response is obtained from the node 12. Then, the node state monitoring section 25 writes the thus determined state into a state area of the node 12 of the management data base 23 via the data base control section 24.

The network management system 15 displays the contents of the management data base 23 as management information for each node 12, for example, in a format shown in FIG. 2 on the display 22. Then, for example, the network management system 15 displays the normal node 12 in green and displays the node 12 in the stopped state or fault state in red. Further, the network management system 15 displays the host name which is originally set for the node 12 and an IP address stored in the management data base 23 for each node.

Next, the operations for newly assigning the IP address for each node 12 by the DHCP server 13, updating (lease rewriting) the assigned IP address and releasing the assigned IP address are explained in detail.

Figure 9:
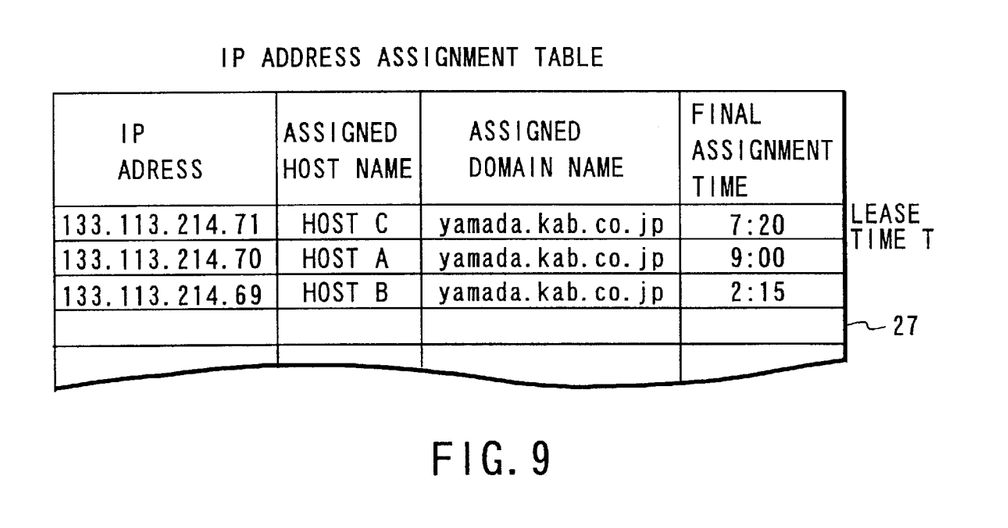
FIG. 9 is a diagram showing an address assignment table formed in the DHCP server in the network management system according to the first embodiment.

An IP address assignment table 27 shown in FIG. 9 is formed in the DHCP server 13 constructed by a type of computer. In the IP address assignment table 27, a name constructed by a combination of a host name and domain name of the node 12 to which a corresponding IP address is assigned and the last assignment time Te determined by taking the update time into consideration are set for every N IP addresses managed by the DHCP server 13. The host name, domain name and final assignment time Te are cleared when the assignment of the corresponding IP address is released (terminated).

Figure 7:
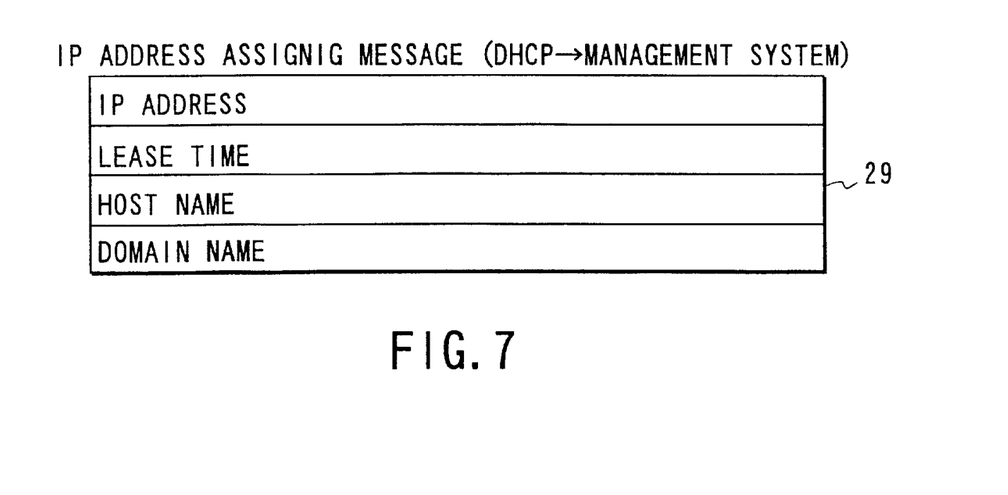
FIG. 7 is a diagram showing an IP address assignment message (DHCP→management system) in the network management system according to the first embodiment.
Figure 8:
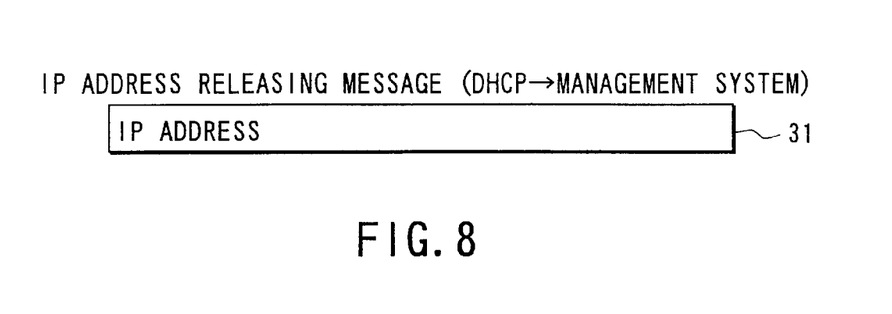
FIG. 8 is a diagram showing an IP address release message (DHCP→management system) in the network management system according to the first embodiment.

A notifying section 28 for transmitting an IP address assigning message 29 and IP address updating message 30 shown in FIG. 7 and an IP address releasing message 31 shown in FIG. 8 to the notification receiving section 26 of the network management system 15 is provided in the DHCP server 13.

Figure 10:
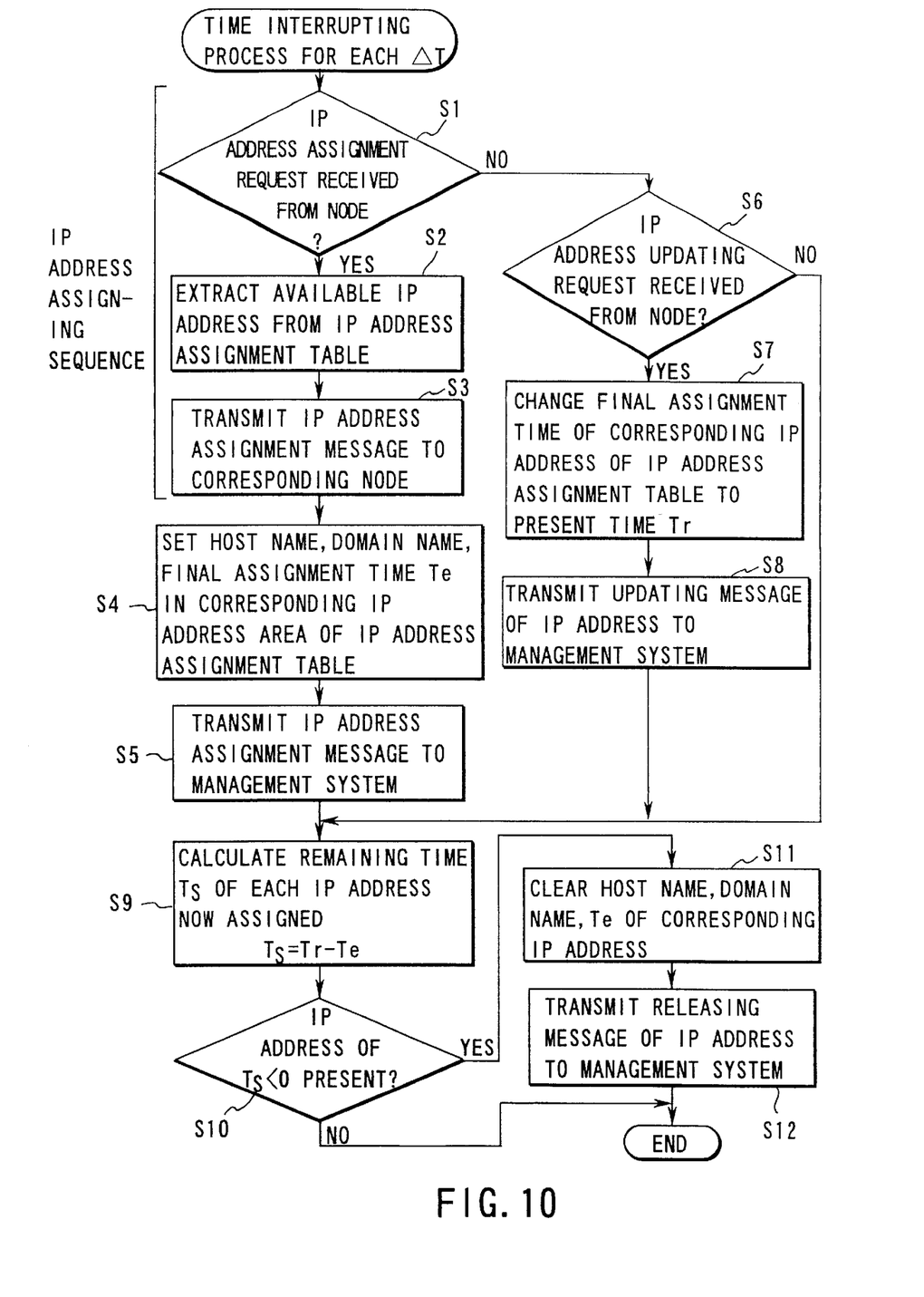
FIG. 10 is a flow diagram showing the operation of the DHCP server in the network management system according to the first embodiment.

The DHCP server 13 executes the IP address assignment process, updating process and releasing process for each node 12 according to the flow diagram of FIG. 10 each time a short time $\Delta T$ elapses.

Figure 6:
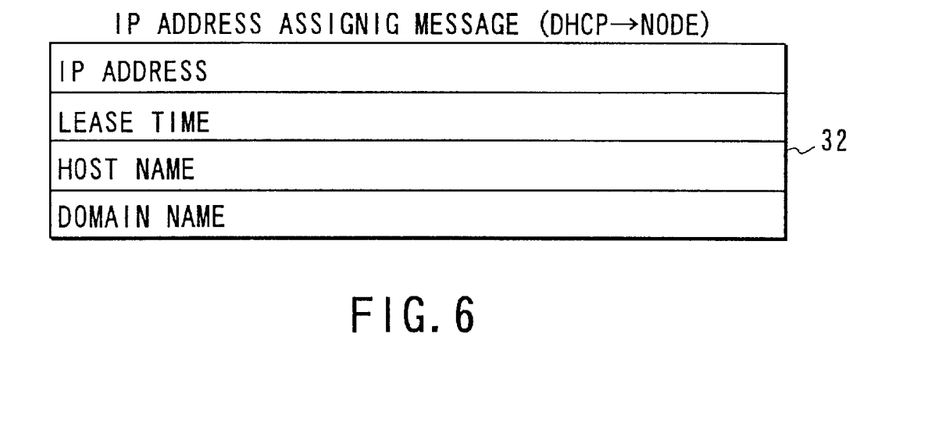
FIG. 6 is a diagram showing an IP address assignment message (DHCP→node) in the network management system according to the first embodiment.

If an IP address assignment request specifying the host name of a node 12 itself is input via broadcast communication from the node 12 in the step S1, a non-use IP address is extracted from the IP address assignment table 27 (step S2) and an IP address assigning message 32 shown in FIG. 6 is formed and transmitted to the corresponding node 12 (step S3). The process in the steps S1 to S3 is effected according to the known DHCP protocol and the detail explanation therefor is omitted.

Next, the host name, domain name and last assignment time Te constructed by the present time Tr of a node 12 of the assignment destination are set in an area of the corresponding IP address of the IP address assignment table 27 (step S4). Then, an IP address assigning message 29 containing the IP address assigned at this time, lease period (assignment time) T, host name and domain name shown in FIG. 7 is transmitted to the notification receiving section 26 of the network management system 15 via the notifying section 28 (step S5).

If an update request of the IP address is input from the node 12 to which the IP address has been assigned in the step S6, the last assignment time Te 15 of the corresponding IP address in the IP address assignment table 27 is updated to the present time Tr (Te=Tr) in the step S7. Then, the IP address, host name and domain name are incorporated into a specified IP address updating message 30 and transmitted to the notification receiving section 26 of the network management system 15 (step S8).

When the above processes are terminated, assignment remaining time Ts of each IP address assigned to each node 12 in the IP address assignment table 27 is calculated by use of the present time Tr and last assignment time Te of the corresponding area (Ts=Tr−Te). If the assignment remaining time Ts is longer than the lease period (assignment time) T (step S10), the host name, domain name and last assignment time Te of the IP address are cleared (step S11). Then, the IP address releasing message 31 shown in FIG. 8 and containing the corresponding IP address is formed and transmitted to the notification receiving section 26 of the network management system 15 (step S12).

Figure 11:
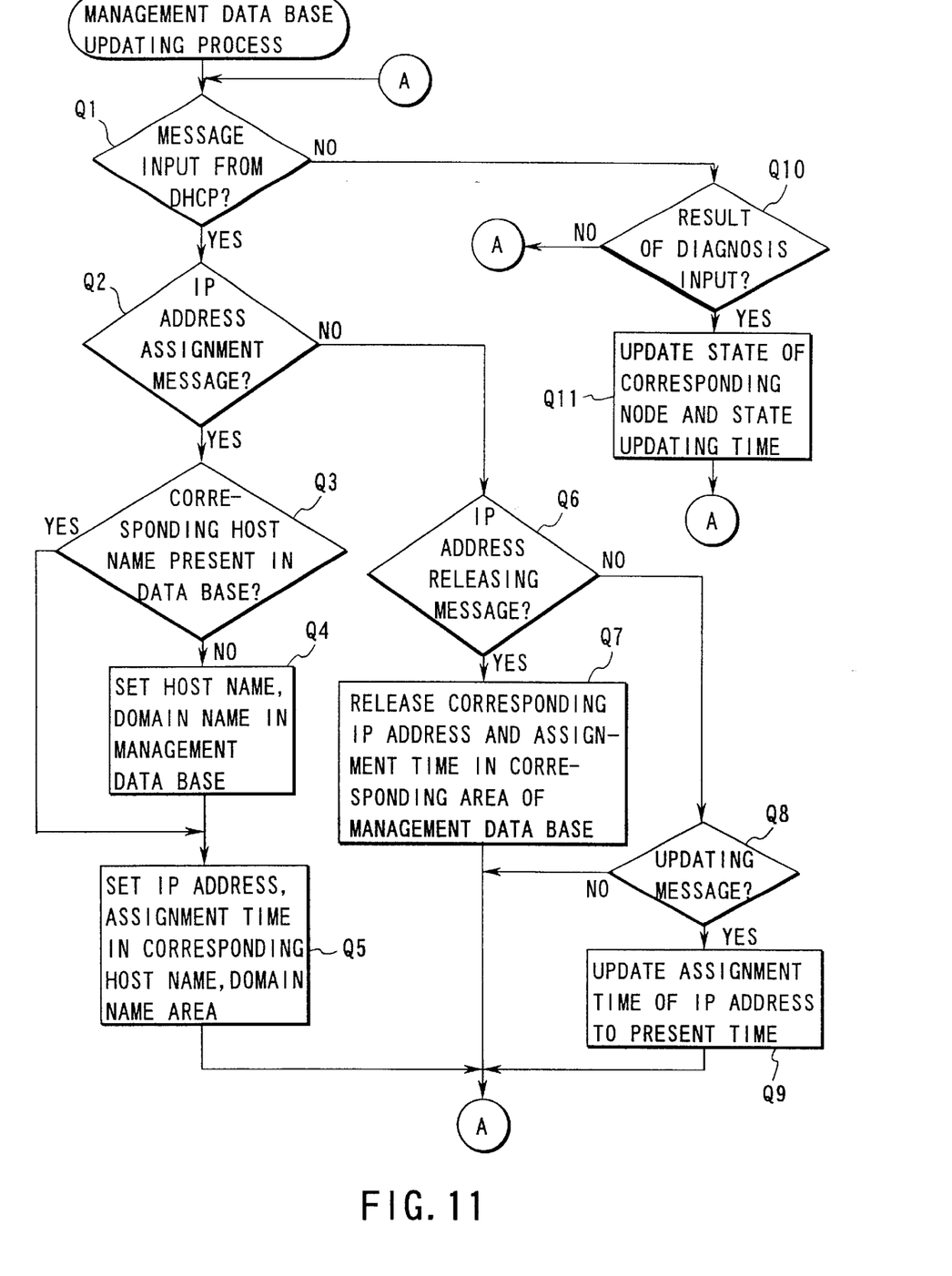
FIG. 11 is a flow diagram showing the operation of the network management system according to the first embodiment.

Next, the sections 24, 25, 26 of the network management system 15 execute the update process for the management data base 23 according to the flow diagram shown in FIG. 11.

If a message is input from DHCP server 13 via the notification receiving section 26 in the step Q1, the type of the message is checked. If the type of the message is the IP address assigning message 29 shown in FIG. 7 (step Q2), whether or not the host name of a node 12 specified by the IP address assigning message 29 is already registered in the management data base 23 is checked (step Q3). If the message is not registered, the host name and domain name of the corresponding node 12 are newly set in a new area (step Q4).

After this, a specified IP address is set in an area of the host name and domain name specified by the IP address assigning message 29 of the management data base 23 and the present time Tr is set as assignment time (step Q5).

If the message from the DHCP server 13 is the IP address releasing message 31 shown in FIG. 8 (step Q6), a corresponding IP address of the management data base 23 and assignment time of the corresponding area are deleted (step Q7).

If the message from the DHCP server 13 is the IP address updating message 30 (step Q8), the assignment time of a corresponding IP address of the management data base 23 is updated to the present time Tr (step Q9).

Further, if the result of diagnosis containing the operation of monitoring the operating/stopped state of each node 12 is input from the node state monitoring section 25 in the step Q10, the state of the area of the host name and domain name specified by the corresponding node 12 is updated based on the result of diagnosis and the state updating time Tg is updated to the present time Tr (Tg=Tr) in the step Q11.

In the network management system 15 of the first embodiment, the IP address assigning message 29, IP address updating message 30 or IP address releasing message 31 containing an IP address to be newly assigned, updated or released is transmitted to the. network management system 15 in a case where the DHCP server 13 newly assigns an IP address to each node 12, it updates the IP address assigned to each node 12, or it releases the IP address assigned to each node 12.

Therefore, when the network management system 15 receives the message 29, 30, 31 from the DHCP server 13, the network management system 15 registers a new IP address to the node 12 in the management data base 23, updates the assigned IP address or deletes the assigned IP address according to the contents of the message 29, 30, 31.

The conventional network management system 5 shown in FIG. 1 takes a method for tracing all of the nodes 2 incorporated in the network 3 and including the node 2 which is not changed in order to search for a node 2 in which the IP address assignment state is changed. In comparison with the conventional method, in the system of the first embodiment of this invention, a change of the IP address assignment state in each node 12 can be grasped in a shorter time without delay.

As a result, the storage information of the management data base 23 always coincides with the actual state of the network 10 and the storage contents of the management data base 23 are displayed as management information of each node 12 on the display 22 so that management information for each node 12 monitored by the manager can be updated without delay with respect to newest information.

Thus, the management performance of the network management system 15 can be greatly enhanced.

Second Embodiment

Figure 12:
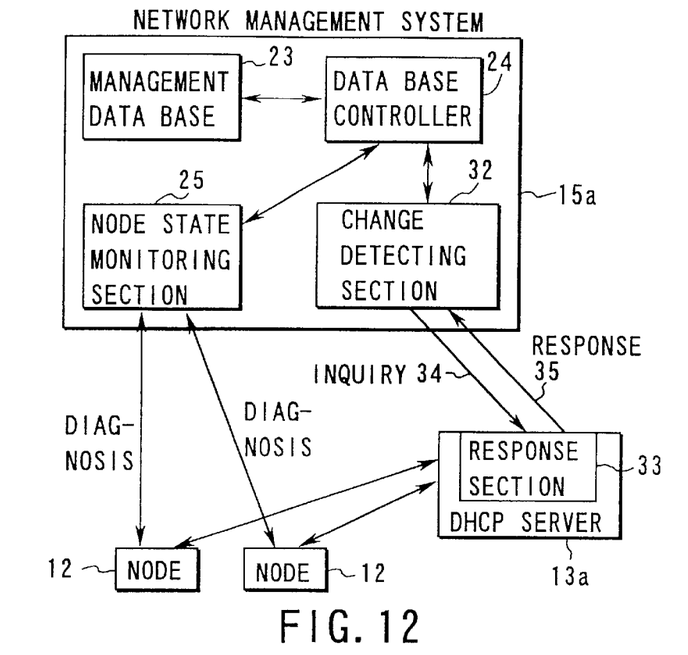
FIG. 12 is a block diagram showing various processing sections formed on an application program of the network management system according to a second embodiment of this invention.

FIG. 12 is a block diagram showing various processing sections formed on an application program of a network management system 15a according to a second embodiment of this invention. Portions which are the same as those in the block diagram of the system according to the first embodiment shown in FIG. 4 are denoted by the same reference numerals. Therefore, the repetitive explanation for the same portion is omitted.

In the network management system 15a according to the second embodiment, a change detecting section 32 is provided instead of the notification receiving section 26. Further, a response section 33 is provided instead of the notifying section 28 in a DHCP server 13a.

In the DHCP server 13a, an IP address assignment table 27 shown in FIG. 9 is formed. In the same way as the DHCP server 13 in the system of the first embodiment, the DHCP server 13a newly assigns an IP address in response to an IP address assignment request from each node 12, updates the IP address in response to an IP address update request from each node 12, and releases the assigned IP address to which the update request is not made after the end of the lease period T. The DHCP server 13a updates the assignment contents of the IP address assignment table 27 based on the results of the above processes.

Further, the response section 33 of the DHCP server 13a forms a response message 35 from the assignment state of the IP address assignment table 27 according to various inquiry messages 34 relating to the IP address assignment state from the change detecting section 32 of the network management system 15a and sends the message to the change detecting section 32.

The change detecting section 32 of the network management system 15a transmits the inquiry message 34 of IP address newly assigning information, IP address updating information and IP address releasing information to the response section 33 of the DHCP server 13a in a preset period.

The response section 33 of the DHCP server 13a effects a preset one of the following processes (a) to (c) in response to the inquiry message 34 of newly assigning information:

(a) the process of sending the list of IP addresses newly assigned after a response to the preceding inquiry as the response message 35, (b) the process of sending the list of all of the IP addresses assigned at the time of reception of the inquiry as the response message 35, and (c) the process of sending information containing sets of assigned IP addresses and assigned times in the form of list as the response message 35.

In each of the above processes, information of the host name, domain name and IP address lease period (assignment time) T of each assigned node 12 is contained in the response message 35 in addition to the IP address.

Further, the response section 33 of the DHCP server 13a sends an update request IP address as the response message 34 in response to the inquiry message 34 of update information.

The response section 33 of the DHCP server 13a effects a preset one of the following processes (a) and (b) in response to the inquiry message 34 of release information:

(a) the process of sending the list of IP addresses newly released after responding to the preceding inquiry as the response message 34, and (b) the process of sending the list of all of the IP addresses assigned at the time of reception of the inquiry as the response message 34.

The change detecting section 32 of the network management system 15a transmits IP address newly assigning information, IP address updating information and IP address releasing information extracted from the DHCP server 13a to the data base control section 24. The data base control section 24 updates the storage contents for the IP addresses of the management data base 23 based on the newly assigning information, updating information and releasing information.

Also, in the network management system 15a of the second embodiment with the above construction, since the processes of newly assigning the IP address, updating the assigned IP address and deleting the assigned IP address for each node 12 in the management data base 23 are performed without delay with respect to the newly assigning, updating and releasing processes for each node 12 effected by the DHCP server 13a, substantially the same effect as in the network management system 15 of the first embodiment can be attained.

Third Embodiment

Figure 13:
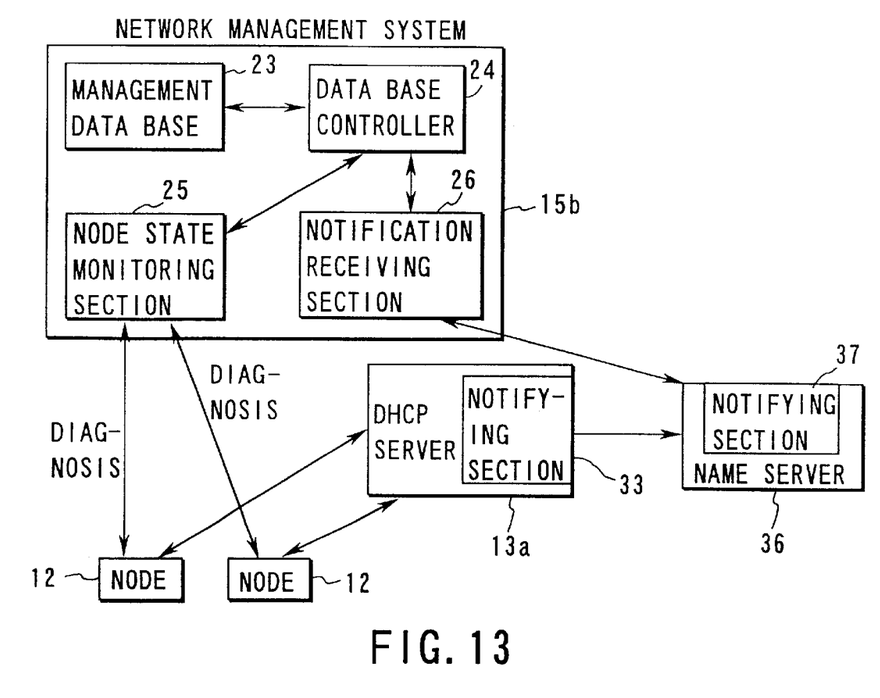
FIG. 13 is a block diagram showing various processing sections formed on an application program of the network management system according to a third embodiment of this invention.

FIG. 13 is a block diagram showing various processing sections formed on an application program of a network management system 15b according to a third embodiment of this invention. Portions which are the same as those in the block diagram of the system according to the first embodiment shown in FIG. 4 are denoted by the same reference numerals. Therefore, the repetitive explanation for the same portion is omitted.

A notification receiving section 26 of the network management system 15b of the third embodiment receives a change of the related information of each host name and IP address output from a notifying section 37 of a name server 36. That is, the name server 36 is provided in addition to the DHCP server 13a shown in the system of the second embodiment for effecting the processes of newly assigning, updating and releasing an IP address for each node 12.

Figure 14:
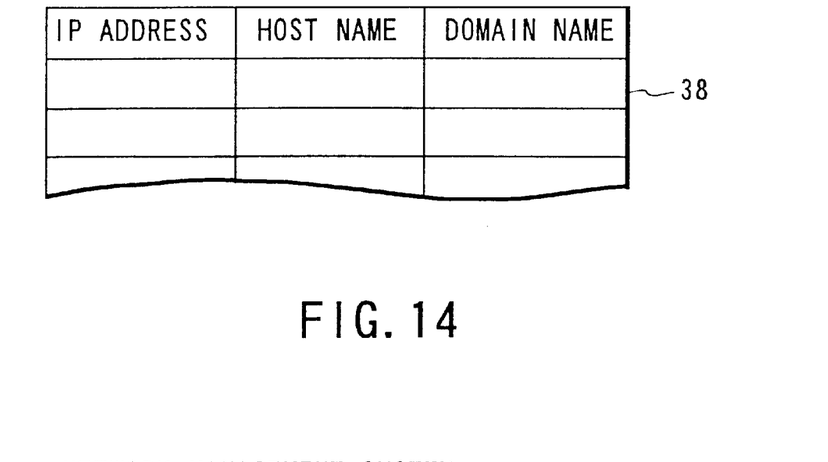
FIG. 14 is a diagram showing storage contents of a correspondence table formed in the name server in the network management system according to the third embodiment.

The name server 36 manages the correspondence relation between the host name and IP address of each node 12 incorporated in the network 10. The name server 36 has a correspondence table 38 for storing the relation between the IP address and the name constructed by a combination of a host name and domain name as shown in FIG. 14.

As an example of the name server 36, a DNS server for realizing the DNS (Domain Name System) service defined in terms of IETF RFC 1033, 1034, 1035, 1101, 1123, 1183, 1036 may be considered. The DNS server has a function of responding to an external inquiry to issue the relation between the IP address dynamically assigned to each node 12 by the DHCP server 13a and the host name originally attached to each node 12 in addition to the function defined by the RFC.

The DNS server itself having the above function is already known.

In the third embodiment, the DNS server used as the name server 36 receives notification relating to the assignment of the IP address from the notifying section 33 of the DHCP server 13a and updates the relation information between the IP address and the host name and domain name of its own correspondence table 38 based on the received notification.

When the relation information between the IP address and the host name is newly set, when the relation between the IP address and the host name is updated or when the relation information between the IP address and the host name is released, the notifying section 37 of the name server 36 incorporates the in formation into the message and transmits the same to the notification receiving section 26 of the network management system 15b.

In the network management system 15b, if information of newly setting, updating or releasing the relation information between the IP address and the host name is received in the notification receiving section 26, the data base control section 24 initiates to operate and registers an IP address for the host name in the management data base 23, updates the IP address already set for the host name or deletes the IP address already set for the host name.

Also, in the network management system 15b of the third embodiment described above construction, since the processes of newly assigning the IP address, updating the assigned IP address and deleting the assigned IP address for each node 12 in the management data base 23 are performed without delay with respect to the newly assigning, updating and releasing processes for each node 12 effected by the DHCP server 13a, substantially the same effect as in the network management systems 15, 15a of the first and second embodiments can be attained.

The name server 36 is not necessarily the DNS server and can be any type of system if it can hold the relation between the IP address and the name constructed by a combination of the domain name and host name specifying the node 12 as data. For example, a server having part of ITU-T recommendation X.500 mounted thereon or a WINS (Windows Internet Name Service) server corresponding to IETF RFC 1001, 1002 may be used. In the case of WINS server, NetBIOS (Network Basic Input Output System) is used instead of the name constructed by the host name and domain name, but the other relation with respect to the network management system is the same as described above.

Fourth Embodiment

Figure 15:
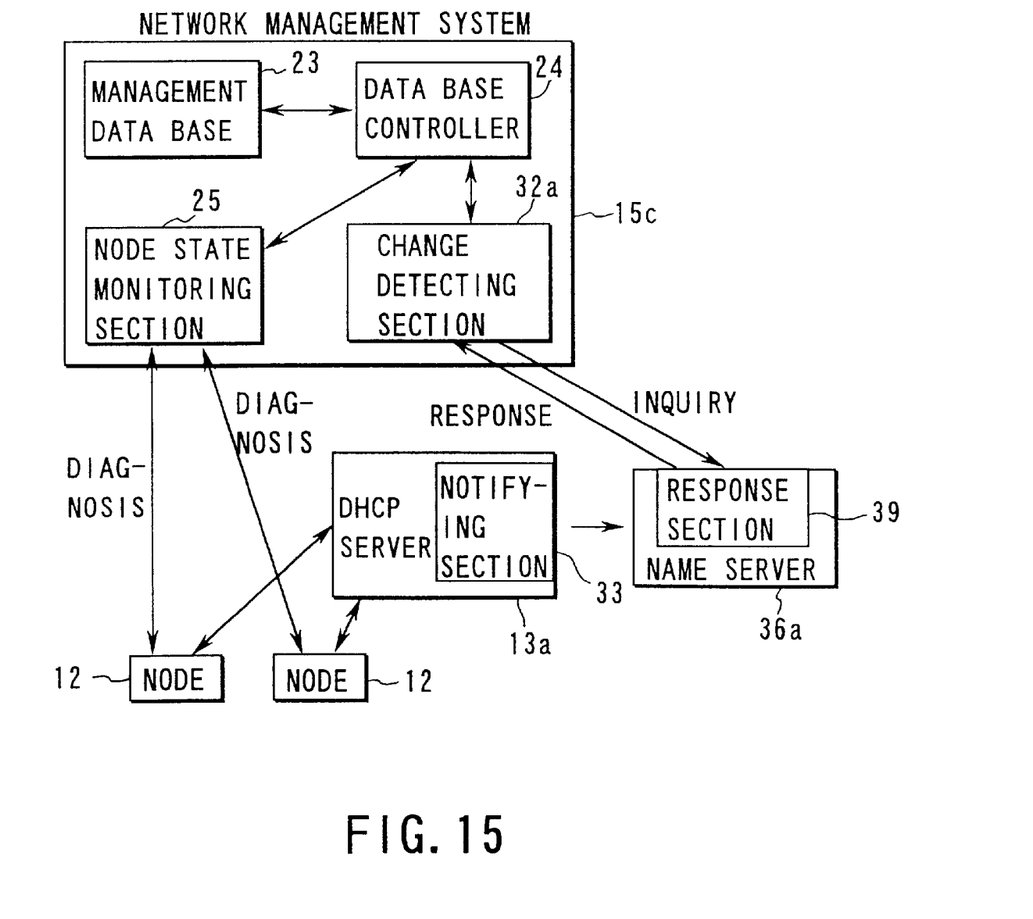
FIG. 15 is a block diagram showing various processing sections formed on an application program of the network management system according to a fourth embodiment of this invention.

FIG. 15 is a block diagram showing various processing sections formed on an application program of a network management system 15c according to a fourth embodiment of this invention. Portions which are the same as those in the block diagram of the system according to the third embodiment shown in FIG. 13 are denoted by the same reference numerals. Therefore, the repetitive explanation for the same portion is omitted.

In the network management system 15c according to the fourth embodiment, a change detecting section 32a is provided instead of the notification receiving section 26. Further, a response section 39 which responds to an inquiry specifying an IP address from the change detecting section 32a is provided in a name server 36a.

Like the name server 36 of the system of the third embodiment shown in FIG. 13, the name server 36a stores and holds the relation between the IP address and the host name of each node 12 incorporated in the network 10 based on information from the DHCP server 13a.

The change detecting section 32a of the network management system 15c previously stores IP addresses supplied to a network 10 which is to be managed by the network management system 15c itself. The plurality of supplied IP addresses include fixedly assigned IP addresses such as IP addresses of the network management system 15c, DHCP server 13a and router 14 and IP addresses dynamically assigned to respective nodes 12.

The change detecting section 32a incorporates a request for conversion (which is hereinafter referred to as "resolution") from an IP address to a name for each IP address which is required to be managed, for example, an IP address dynamically assigned to each node 12 into an inquiry message and periodically transmits the same to the response section 39 of the name server 36a.

If a name constructed by a combination of the host name and domain name corresponding to the IP address contained in the inquiry message received from the change detecting section 32a is present, the response section 39 of the name server 36a deals with the name as resolution information, incorporates the IP address of the inquiry and the corresponding host name and domain name into a response message and sends the same to the change detecting section 32a.

If a host name and domain name corresponding to the IP address contained in the inquiry message received from the change detecting section 32a are not present, the response section 39 incorporates information indicating that the host name and domain name are not present into a response message and sends the same to the change detecting section 32a.

The data base control section 24 of the network management system 15c comes to know the resolution, state of the name constructed by a combination of the host name and domain name corresponding to each IP address from the change detecting section 32a, that is, the presence or absence of the host name and domain name corresponding to each IP address to be managed. Then, the data base control section 24 determines the new assignment, updating or releasing of an IP address corresponding to each host name and domain name based on the presence or absence of the host name and domain name and updates the storage contents of the management data base 23 to newest information based on the result of determination.

Therefore, in the network management system 15c of the fourth embodiment with the above construction, since the processes of newly assigning the IP address, updating the assigned IP address and deleting the assigned IP address for each node 12 in the management data base 23 are performed without delay with respect to the newly assigning, updating and releasing processes for each node 12 effected by the DHCP server 13a, substantially the same effect as in the network management systems 15, 15a, 15b of the first, second and third embodiments can be attained.

The name server 36 is not necessarily required to hold information indicating the relation between the IP address and the host name and domain name and it is possible to make an inquiry to another name server in response to an inquiry request from the other so as to acquire the correct relation between the IP address and the host name and domain name and respond to the network management system 15c.

For example, in the DNS server function provided by Windows NT Server 4.0 which is an OS of US Microsoft Corporation, it is possible to use the same in combination with the WINS server provided by the above OS and correctly respond to a resolution request of forward or reverse direction of DNS even if a dynamically changing IP address is present.

Further, in the network management system 15c of the fourth embodiment, the change detecting section 32a makes an inquiry to the name server 36a and acquires a response to the inquiry from the name server 36a. Therefore, the effect described above can be easily attained by changing only the network management system without greatly changing the conventional name server.

Fifth Embodiment

Figure 16:
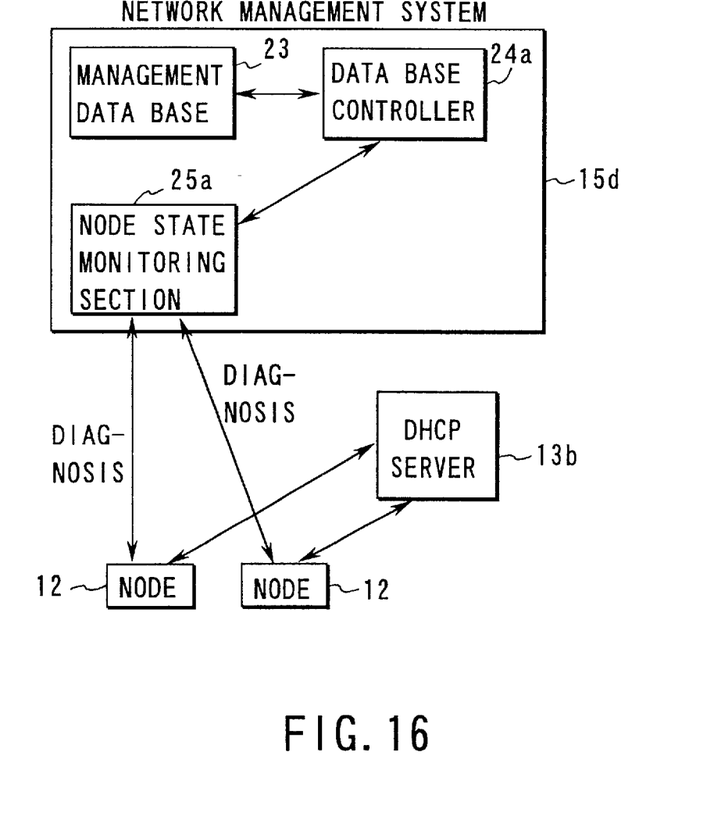
FIG. 16 is a block diagram showing various processing sections formed on an application program of the network management system according to a fifth embodiment of this invention.

FIG. 16 is a block diagram showing various processing sections formed on an application program of a network management system 15d according to a fifth embodiment of this invention. Portions which are the same as those in the block diagram of the system according to the first embodiment shown in FIG. 4 are denoted by the same reference numerals. Therefore, the repetitive explanation for the same portion is omitted.

Figure 17:
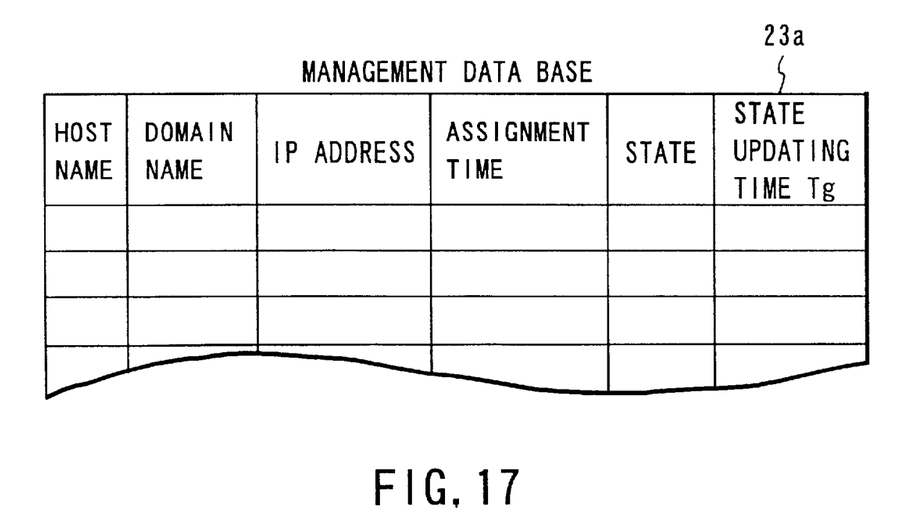
FIG. 17 is a diagram showing storage contents of a management data base formed in the network management system according to the fifth embodiment.

In the network management system 15d according to the fifth embodiment, a management data base 23a having the same construction as the management data base shown in FIG. 5, a data base control section 24a, and a node state monitoring section 25a are provided and the notification receiving section 26 is omitted as shown in FIG. 17.

In the network management system 15d, the assignment of an IP address to each node 12 of the management data base 23a is effected in the same manner as in the conventional network management system 5 shown in FIG. 1. That is, the node state monitoring section 25a sequentially traces the nodes 12 in a preset order to detect an IP address assigned to each node 12 and registers the IP address in the management data base 23a.

Further, the node state monitoring section 25a periodically diagnoses each nodes 12 and deletes the IP address which is once registered in the management data base 23a based on the result of diagnosis.

Figure 18:
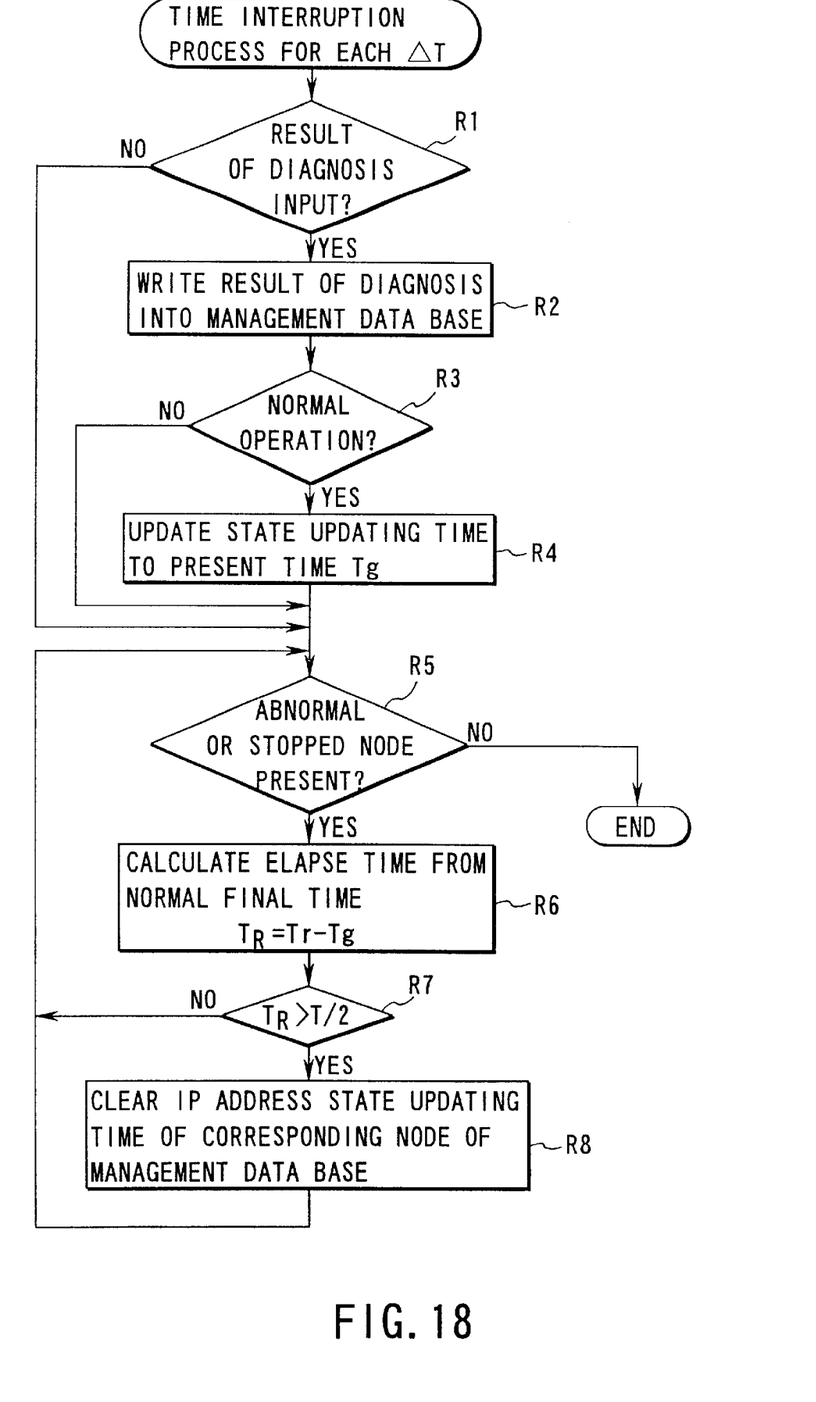
FIG. 18 is a flow diagram showing the operation of the network management system according to the fifth embodiment.

Specifically, the data base control section 24a effects the deleting process for each IP address according to the flow diagram of FIG. 18 each time a short time $\Delta T$ elapses.

If the result of diagnosis containing determination of the normal operating state/abnormal state or stopped state for one node 12 is input from the node state monitoring section 25a in the step R1, the result of diagnosis of normal or stopped state is written into the area of the state of the host name and domain name of the corresponding node 12 of the management data base 23a (step R2). Then, in the case of normal state (step R3), the present time Tr is written into the management data base 23a as state updating time Tg in the step R4 (Tg=Tr). In the case of abnormal state or stopped state, the state updating time Tg is not updated by the present time.

If it is detected in the step R5 that a node 12 of the abnormal or stopped state is present in the nodes 12 of the management data base 23a, elapse time $T_R$ from the state updating time Tg which is the terminating time of the normal state of the corresponding node 12 is calculated (TR=Tr−Tg).

If the thus calculated elapse time TR exceeds time (T/2) which is half the lease period (assignment time) T when an IP address is assigned to each node 12 by the DHCP server 13b (step R7), an IP address corresponding to the host name and domain name of the node 12 is deleted (step R8).

Thus, each time the preset time $\Delta T$ elapses and when the elapse time TR from the time (end time of the normal state) at which the node 12 now set in the abnormal state or stopped state has changed to the abnormal state or stopped state exceeds the time (T/2) which is half the lease period (assignment time) of the IP address, it is determined that the assignment of the IP address to the corresponding node 12 is completed.

That is, as described before, when each node 12 continues to use the IP address even after elapse of the lease period (assignment time) T allocated to the node 12, it issues an update request for assignment of the IP address to the DHCP server 13b. Generally, the assignment updating request to the DHCP server 13b is made when time which is half the lease period (assignment time) T has elapsed.

The DHCP server 13b effects the process of releasing the IP address for each node 12 when the lease time (assignment time) T has elapsed after the final IP address updating process for the node 12 was effected.

Therefore, there is a possibility that the DHCP server 13b may release the IP address for the corresponding node 12 in a period of T/2 to T after the node 12 was stopped depending on the timing at which the node 12 was stopped.

That is, if the node 12 is stopped immediately after the node 12 outputs an updating request of the IP address, the IP address is released when the lease period (assignment time) T has elapsed after stoppage of the node 12. However, if the node 12 is stopped when T/2 has elapsed, that is, immediately before the updating request is output, the IP address is released when T/2 has elapsed after stoppage.

In practice, the node state monitoring section 25a of the network management system 15d detects the operating/stopped state of each node 12 in a certain period and there must be a certain amount of delay in the stopped state detecting process.

Therefore, there occurs a possibility that the DHCP server 13b releases the IP address for the corresponding node 12 after the time determined by the maximum value of (stopped time+T/2−detection delay time) recognized by the network management system 15d.

The reason why assignment information of the IP address of the node 12 is deleted from the management data base 23a when the possibility of the IP address for the corresponding node 12 to be released becomes larger than 0 is as follows.

The disadvantage of an inconsistent state caused in the delay time to the time when the network management system 15d detects that the same IP address starts to be used for another node 12 at the next instant is more serious than the disadvantage of an inconsistent state caused by deleting information of the IP address which may not be released in practice by the DHCP server 13b from the management data base 23a on the network management system side.

Therefore, assignment information of IP addresses for the nodes 12 in the management data base 23a is much closer to substantial assignment information of the IP addresses in the actual network 10.

Also, in the network management system 15d of the fifth embodiment with the above construction, since the processes of newly assigning the IP address, updating the assigned IP address and deleting the assigned IP address for each node 12 in the management data base 23a correspond to the substantial assignment state of each IP address for each node 12 in the actual network, substantially the same effect as in the systems of the former embodiments can be attained.

This invention is not limited to the systems of the above embodiments.

In the systems of the first to fourth embodiments, all the information relating to the processes of newly assigning, updating and releasing the IP address for each node 12 stored in the management data base 23 is directly collected from the DHCP server 13, 13a and name server 36, 36a via the notification receiving section 26, change detecting section 32, 32a provided in the network management system.

However, it is possible to collect only information relating to the processes of newly assigning and updating the IP address for each node 12 from the DHCP server 13, 13a and name server 36, 36a and detect the release of the IP address when the node 12 is stopped for a preset period of time as in the case of the conventional network management system 5 in the IP address releasing process.

Further, it is possible to collect only information relating to the process of releasing the IP address for each node 12 from the DHCP server 13, 13a and name server 36, 36a and sequentially trace the nodes 12 in a preset order so as to detect the new assignment and updating of the IP address as in the case of the conventional network management system 5 in the IP address newly assigning and updating processes.

The methods described in the above embodiments can be written into a storage medium such as a magnetic disk (floppy disk, hard disk and the like), optical disk (CD-ROM, DVD and the like), semiconductor memory as a program which can be executed by a computer and applied to various types of devices or transmitted via a communication medium and applied to various types of devices. A computer realizing this device reads out the program stored in the recording medium and the operation thereof is controlled by the program to effect the above processes.

Thus, the network management system of this invention directly acquires information relating to the processes of newly assigning, updating and releasing the IP address from the DHCP server and name server which collectively manage the assignment of the IP addresses to the nodes incorporated in the network and updates the storage contents of the management data base to newest information.

Therefore, even if a node is newly incorporated into the network or the node is eliminated from the network, a change of assignment information of the IP address for each node 12 is instantly acquired and management information for each node which is now output can be updated to newest information without delay.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network management system for managing states of nodes to which IP addresses are dynamically assigned in an IP address assigning section incorporated in a network, comprising:
   a management data base for storing at least a name, IP address and operating state of the node for each node;
   assigning information collecting means for collecting changes of assigning information in the IP address assigning section when the IP address assigning section makes a change of assigning information of the IP address for each node; and
   data base managing means for updating the storage contents of said management data base to newest information based on assigning information of the IP address of each node collected by said assigning information collecting means.

2. A network management system according to claim 1, wherein the IP address assigning section is a DHCP (Dynamic Host Configuration Protocol) server.

3. A network management system according to claim 1, wherein the process of changing the assigning information of the IP address includes at lest one of the processes of assigning a new IP address to the node, updating the assigned IP address for each node, and releasing the assigned IP address for each node.

4. A network management system according to claim 1, wherein said assigning information collecting means collects changes of assignment information in the IP address assigning section by receiving a message indicating a change of the assigning information output from the IP address assigning section when the IP address assigning section makes a change of the assignment information of the IP address for each node.

5. A network management system according to claim 1, wherein said assigning information collecting means collects changes of assigning information in the IP address assigning section by periodically making an inquiry about the assigning information to the IP address assigning section.

6. A network comprising:
   a plurality of nodes;
   an IP address assigning section for dynamically assigning IP addresses to said plurality of nodes; and
   a network management system for managing various states of said plurality of nodes;
   wherein said network management system comprises:
       a management data base for storing at least a name, IP address and operating state of the node for each node;
       inquiry means for making an inquiry about assigning information of the IP address for each node to said IP address assigning section; and
       data base management means for updating the storage contents of said management data base to newest information based on assigning information of the IP address of each node sent from said IP address assigning section in response to the inquiry; and
       said IP address assigning section sends assigning information of the IP address for each node in response to the inquiry about assigning information of the IP address from said network management system.

7. A network according to claim 6, wherein the inquiry about the IP address assigning information includes an inquiry about new assigning information of the IP address, an inquiry about updating information of the IP address and an inquiry about releasing of the IP address.

8. A network according to claim 7, wherein said IP address assigning section effects one of the following response processes (a), (b) and (c) according to the inquiry about newly assigning information of the IP address from said network management system:
   (a) the process for sending a list of IP addresses newly assigned after response to the preceding inquiry as a response message;
   (b) the process for sending a list of all of the IP addresses assigned at the time of reception of the inquiry as a response message; and
   (c) the process for sending information of a set of assigned IP address and assigned time in the form of list as response message.

9. A network according to claim 7, wherein said IP address assigning section effects one of the following response processes (a) and (b) according to the inquiry about releasing information of the IP address from said network management system:

(a) the process for sending a list of IP addresses released after a response to the preceding inquiry as a response message; and (b) the process for sending a list of all of the IP addresses assigned at the time of reception of the inquiry as a response message.

10. A network management system for managing various states of nodes which are incorporated in a network and to each of which an original name and a dynamically changing IP address are given, comprising:

a management data base for storing at least a name, IP address and operating state of the node for each node;

management information outputting means for outputting storage contents of said management data base as management information for each node;

related information collecting means for collecting changes of related information in a name server for monitoring the related information when the name server detects a change of the related information, the related information representing a relation between the name and IP address of each node; and data base managing means for updating the storage contents of said management data base to newest information based on related information collected by said related information collecting means.

11. A network management system according to claim 10, wherein the name server is a DNS (Domain Name System) server.

12. A network management system according to claim 10, wherein the process for changing the related information of the name and IP address includes at least one of processes for relating a new IP address to each name, updating the relation between each name and IP address, and canceling the relation between each name and IP address.

13. A network management system according to claim 10, wherein said assigning information collecting means collects changes of related information in the name server by receiving a message indicating a change of the related information output from the name server when the name server detects a change of the related information of the IP address and name of each node.

14. A network management system according to claim 10, wherein said assigning information collecting means collects changes of related information in the name server by making an inquiry about the related information of the name with respect to each IP address to the name server.

15. A network management system according to claim 10, wherein the name server detects the change of the related information from an IP address assigning section.

16. A network management system for managing various states of nodes to which IP addresses are dynamically assigned by an IP address assigning section incorporated in a network, comprising:

a management data base for storing at least a name, IP address and operating state of the node for each node;

a node state monitoring section for periodically diagnosing the operating state of each node; and data base management means for updating the storage contents of said management data base to newest information according to the operating state of each node obtained from said node state monitoring section and deleting an IP address of a corresponding node in at least said management data base when the corresponding node is not operated for a period exceeding a preset period of time determined based on assignment time of the IP address in the IP address assigning section.

17. A network management system according to claim 16, wherein the preset period of time is equal to half the IP address assigning time.

18. A recording medium for storing a program for managing various states of nodes in a network management system, which manages various states of the nodes to which IP addresses are dynamically assigned in an IP address assigning section incorporated in a network, wherein the program causes a computer to execute the functions of assigning information collecting means for collecting changes of assigning information in the IP address assigning section when the IP address assigning section makes a change of assigning information of the IP address for each node; and data base managing means for updating the storage contents of a management data base to newest information based on assigning information of the IP address of each node collected by said assigning information collecting means, and said management data base stores at least a name, IP address and operating state of a node for each node as management information for each node.

19. A recording medium for storing a program for managing various states of nodes in a network management system, which manages various states of the nodes which are incorporated in a network and to each of which an original name and a dynamically changing IP address are given, wherein the program causes a computer to execute the function of related information collecting means for collecting changes of related information in a name server for monitoring the related information when the name server detects a change of the related information, the related information represents a relation between the name and IP address of each node; and the function of data base managing means for updating the storage contents of a management data base to newest information based on related information collected by said related information collecting means, and said management data base stores at least a name, IP address and operating state of a node for each node as management information for each node.

20. A recording medium for storing a program for managing various states of nodes in a network management system for managing various states of the nodes to which IP addresses are dynamically assigned in an IP address assigning section incorporated in a network;

wherein the program causes a computer to execute the function of node state monitoring means for periodically diagnosing the operating state of each node; and the function of data base management means for updating the storage contents of a management data base to newest information according to the operating state of each node obtained from said node state monitoring means and deleting an IP address of a corresponding node in at least said management data base when the corresponding node is not operated for a period exceeding a preset period of time determined based on assignment time of the IP address in the IP address assigning section, and said management data base stores at least a name, IP address and operating state of node for each node.

* * * * *